United States Patent
Wu et al.

(10) Patent No.: US 9,684,397 B2
(45) Date of Patent: Jun. 20, 2017

(54) LAMINATED STRUCTURE, A TOUCH DISPLAY HAVING A LAMINATED STRUCTURE, AND A LAMINATING METHOD THEREOF

(75) Inventors: Jia Wu, Xiamen (CN); Yau-Chen Jiang, Zhubei (TW); Pingping Huang, Sanming (CN); Wei Wang, Xi'an (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 586 days.

(21) Appl. No.: 13/469,097

(22) Filed: May 11, 2012

(65) Prior Publication Data
US 2013/0141347 A1    Jun. 6, 2013

(30) Foreign Application Priority Data

Dec. 2, 2011  (CN) .......................... 2011 1 0402439

(51) Int. Cl.
*G06F 3/045* (2006.01)
*G06F 3/041* (2006.01)
*G02F 1/1333* (2006.01)

(52) U.S. Cl.
CPC ........ *G06F 3/041* (2013.01); *G02F 1/133308* (2013.01); *G02F 1/13338* (2013.01); *G02F 2001/13332* (2013.01)

(58) Field of Classification Search
CPC ......... G09F 3/041; H05K 7/00; G02F 1/1333; G06F 3/041; G06F 3/0414; G06F 3/0416; G06F 3/045
USPC ................ 345/173–178; 349/84; 361/679.01
See application file for complete search history.

(56) References Cited

U.S. PATENT DOCUMENTS

| 6,625,007 | B2 | 9/2003 | Sakata et al. | |
|---|---|---|---|---|
| 2004/0169580 | A1 | 9/2004 | Kim et al. | |
| 2009/0213092 | A1* | 8/2009 | Kuo et al. | 345/174 |
| 2009/0213291 | A1* | 8/2009 | Choi | 349/58 |
| 2009/0322705 | A1* | 12/2009 | Halsey, IV | 345/174 |
| 2010/0045618 | A1* | 2/2010 | Huang | 345/173 |
| 2011/0169767 | A1* | 7/2011 | Weindorf et al. | 345/174 |

(Continued)

FOREIGN PATENT DOCUMENTS

| CN | 201583763 | 9/2010 |
|---|---|---|
| CN | 102033635 | 4/2011 |

(Continued)

*Primary Examiner* — Vijay Shankar
(74) *Attorney, Agent, or Firm* — Cooper Legal Group, LLC

(57) ABSTRACT

A touch display having a laminated structure is provided in present disclosure. The touch display comprises a touch panel, a display module, and a step-shaped gasket element. The display module has a step-shaped structure formed due to a height difference, wherein the step-shaped structure is located in an edge area of the display module. The gasket element inosculates with the step-shaped structure of the display module to fill the height difference in the edge area of the display module. In accordance with present disclosure, the gasket element is not in a suspended state usually caused when the gasket element is not being supported by display module and is effectively laminated to an outer frame of display module, thereby enhancing the reliability of lamination of touch panel and display module. Moreover, a laminated structure and a laminating method for touch display having the laminated structure are provided in present disclosure.

20 Claims, 6 Drawing Sheets

(56) References Cited

U.S. PATENT DOCUMENTS

| | | | |
|---|---|---|---|
| 2011/0228460 A1* | 9/2011 | Kim et al. | 361/679.01 |
| 2012/0050975 A1* | 3/2012 | Garelli | G06F 1/1615 |
| | | | 361/679.27 |
| 2012/0307183 A1* | 12/2012 | Schultz et al. | 349/84 |

FOREIGN PATENT DOCUMENTS

| | | |
|---|---|---|
| JP | 2004280432 | 10/2004 |
| TW | 410922 | 9/2011 |

* cited by examiner

LAMINATED STRUCTURE, A TOUCH DISPLAY HAVING A LAMINATED STRUCTURE, AND A LAMINATING METHOD THEREOF

BACKGROUND OF THE INVENTION

This Application claims the benefit of the People's Republic of China Application No.201110402439.3, filed on Dec. 2, 2011.

FIELD OF THE INVENTION

The present disclosure relates to a lamination technology. More particularly, the present disclosure relates to a laminated structure, a touch display having a laminated structure, and a laminating method thereof.

DESCRIPTION OF THE RELATED ART

Electronic displays having a touch function have been widely used in many fields including ATMs, information kiosks, automatic registration machines, among others.

A display having a touch function usually has a touch panel and a display module. There are many methods for laminating a touch panel and a display module, wherein one method is to laminate by means of frame lamination, which includes disposing a gasket between a touch panel and a display module such that adhesive materials on the surfaces of the gasket laminate the touch panel and the display module together, wherein size of the gasket is smaller than sizes of the touch panel and the display module. Further, the gasket is only disposed in an edge area of the display module and the gasket has a certain width, thereby forming an air gap in a non-edge area of the display module and the touch panel. This lamination method is simple but the display module has a structure having a certain height difference in the edge area such that a part of the gasket is in a suspended state due to not being supported in the area having a height difference, making the gasket unable to laminate the touch panel and the display module effectively and making the gasket easily separated, thus affecting reliability of lamination of the touch panel and the display module.

SUMMARY OF THE INVENTION

An object of the present disclosure is to provide a laminated structure, a touch display having the laminated structure, and a laminating method thereof. The laminated structure of the present disclosure uses a step-shaped gasket element to fill a height difference in an edge area of a display module in a touch display, thereby solving the problem in conventional technology that a gasket element is in a suspended state due to a height difference such that the gasket element is easily separated and reliability of lamination of a touch panel and a liquid crystal display module is affected.

The present disclosure provides a touch display having a laminated structure. The touch display comprises: a touch panel; a display module having a step-shaped structure formed by a height difference, wherein the step-shaped structure is located in an edge area of the display module; and a step-shaped gasket element, wherein the gasket element inosculates with the step-shaped structure of the display module to fill the height difference in the edge area of the display module.

The present disclosure further provides a method for laminating a touch display, wherein the method comprises: laminating a step-shaped gasket element to a step-shaped structure of a display module of the touch display, wherein the step-shaped structure of the display module is formed by a height difference and is located in an edge area of the display module, and wherein the gasket element is laminated to the step-shaped structure of the display module by means of inosculation to fill the height difference in the edge area of the display module; and laminating a touch panel to the gasket element.

The present disclosure further provides a laminated structure. The laminated structure is formed by laminating a step-shaped gasket element between two workpieces, wherein one of the two workpieces has a step-shaped structure formed by a height difference, and wherein the gasket element inosculates with the step-shaped structure to fill the height difference of the workpiece.

For the touch display having the laminated structure and the laminating method provided in the present disclosure, a step-shaped gasket element is used to fill the height difference in the edge area of the display module so that the gasket element is not in a suspending state caused by not being supported by the display module and is effectively laminated to an outer frame of the display module, thereby enhancing reliability of lamination of the touch panel and the display module.

For the laminated structure provided in the present disclosure, the step-shaped gasket element fills the height difference of the work-piece such that the gasket element is not in a suspending state caused by not being supported by the work-piece, thereby making the lamination between the workpieces firmer.

BRIEF DESCRIPTION OF THE DRAWINGS

For those skilled in the art to understand the present disclosure, numerous embodiments are described below, annexing drawings to minutely illustrate the matters of the disclosure and the purpose thereof.

DETAILED DESCRIPTION OF THE EMBODIMENTS

Figure 1:
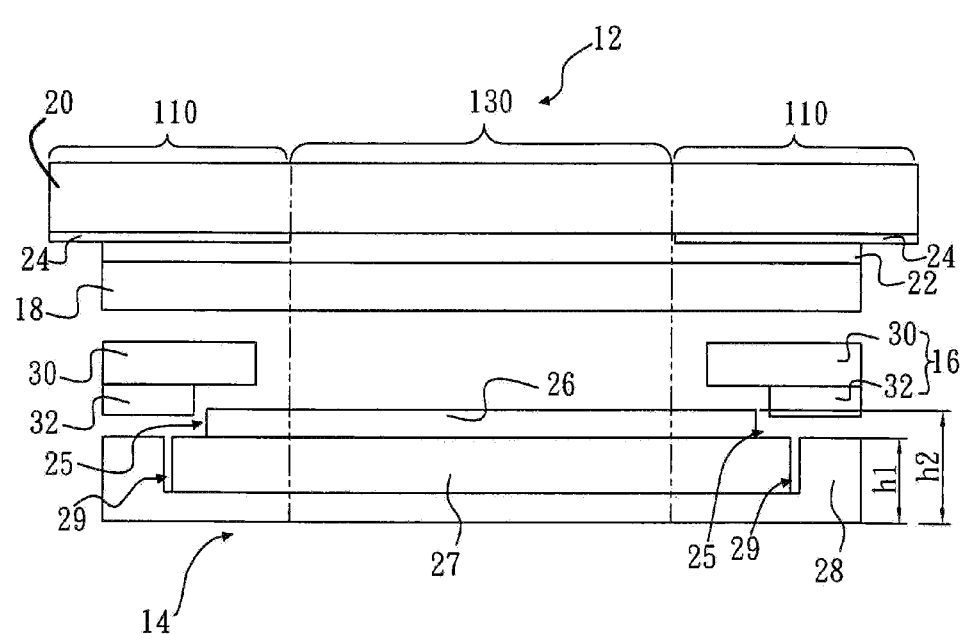
FIG. 1 is a sectional view of a touch display in accordance with the present disclosure.

FIG. 1 is a sectional view of a touch display in accordance with the present disclosure. As shown in FIG. 1, a touch display 10 comprises a touch panel 12, a display module 14, and a step-shaped gasket element 16.

The display module 14 has a step-shaped structure 25 formed by a height difference, wherein the step-shaped structure 25 is located in an edge area 110 of the display module 14. The gasket element 16 inosculates with the step-shaped structure 25 of the display module 14 to fill the height difference in the edge area of the display module 14.

Figure 2:
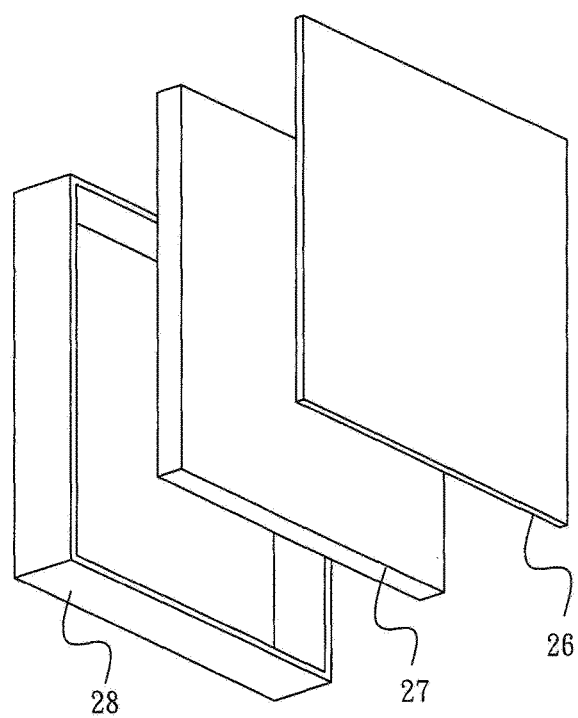
FIG. 2 is an exploded view of a display module shown in FIG. 1.

Referring to FIG. 1 and FIG. 2, FIG. 2 is an exploded view of the display module shown in FIG. 1. The display module 14 comprises a polarizer 26, an outer frame 28, and a display body 27, wherein the display body 27 comprises functional structures of a conventional display such as electrode layers, a liquid crystal layer, a light filter, and the like. The display body 27 is disposed in the outer frame 28 such that the outer frame 28 surrounds all surfaces of the display body 27 except a surface covered by the polarizer 26 to form a first height h1. The polarizer 26 is disposed and attached on a top surface of the display body 27 to form a second height h2; namely, the top surface of the display body 27 is exposed such that the polarizer 26 is attached on it. Height difference between the second height h2 and the first height h1 forms the step-shaped structure 25 in the edge area 110 of the display module 14. The polarizer 26 forms an upper-layer step of the step-shaped structure 25; the outer frame 28 and part of the display body 27 form a lower-layer step of the step-shaped structure 25. In the present embodiment, the height difference value is approximately equivalent to thickness of the polarizer 26.

Besides, two edges of the display body 27 do not contact with the outer frame 28 such that gaps 29 are formed between the edges and the outer frame 28.

The touch panel 12 comprises a touch sensing substrate 18 and a cover glass 20. The touch sensing substrate 18 has a touch sensing layer (not shown), wherein the touch sensing layer comprises a plurality of horizontal electrodes and vertical electrodes intersecting with each other. The touch sensing layer is used to sense electrical signals generated due to a finger or a stylus touching the touch panel 12 and to detect location of a touch point, thereby determining the location of the touch point. The touch sensing substrate 18 is laminated to the cover glass 20 by an adhesive 22. A black mask 24 is formed on the peripheral area of the cover glass 20, wherein the black mask 24 can shield peripheral circuits along with beautifying the appearance. Material of black mask 24 can be black printing ink.

Figure 7:
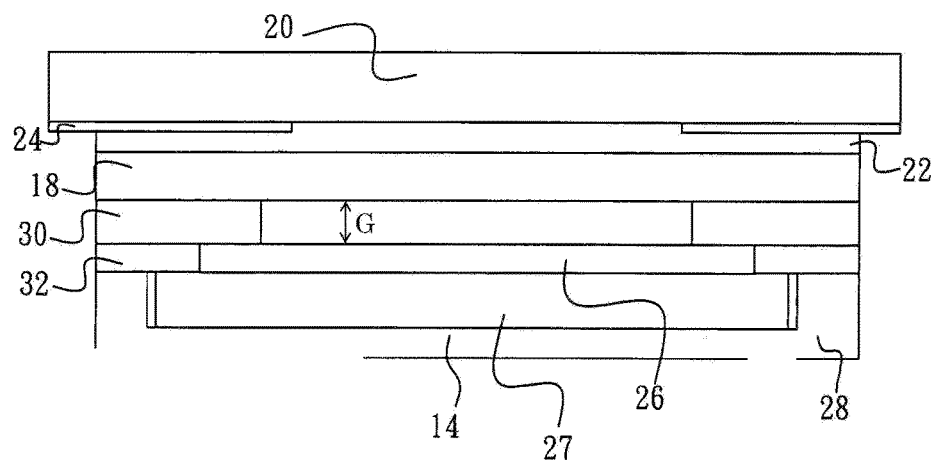
FIG. 7 is a sectional view of the touch display after lamination is completed in accordance with the present disclosure.

The gasket element 16 inosculates with the step-shaped structure 25 in the edge area 110 of the display module 14. Non-edge area 130 is the middle part of the touch panel 12 and the display module 14. Due to support effect of the gasket element 16, an air gap G (as shown in FIG. 7) is formed between the touch panel 12 and the display module 14 such that the touch panel 12 does not directly contact with the display module 14 but is spaced from the display module 14 at a certain distance, thereby avoiding the generation of Mura phenomenon, namely, solving the phenomenon that an image shown is partially uneven in brightness, and also reducing noise interference between the touch panel 12 and the display module 14. The gasket element16 is laminated to the touch panel 12 and the display module 14 by adhesive materials attached on its lamination surfaces. The gasket element 16 can be a one-piece body or a split structure. If the gasket element 16 is a split structure, it is composed of at least two gaskets. For example, in the present embodiment, the gasket element 16 is a double-layer step-shaped structure comprising an upper-layer gasket 30 and a lower-layer gasket 32. More particularly, bottom surface of the lower-layer gasket 32 is laminated to the outer frame 28 of the display module and to part of the display body 27; part of the bottom surface of the upper-layer gasket 30 is laminated to the polarizer 26 of the display module 14, and top surface of the upper-layer gasket 30 is laminated to the touch panel 12. In an embodiment, the gasket element is composed of three gaskets, wherein two gaskets of same size are superposed to form the lower-layer gasket and another gasket is used as the upper-layer gasket. In an embodiment, the gasket element can also be formed by other known possible methods and configurations, which have not been described herein for simplicity. Thus, gasket quantity of the gasket element is not limited to the embodiments illustrated in the present disclosure, and corresponding changes made based on the present disclosure belong to the scope of the present disclosure.

Moreover, material of the gasket element 16 can be, but is not limited thereto to, rubber, plastic or foam.

Lamination method for a touch display having a laminated structure is illustrated below. Structures, materials and applications of the touch panel 12, the display module 14, and the gasket element 16 used in the process of lamination have been described in the above embodiment and therefore no more description is made below.

Figure 8:
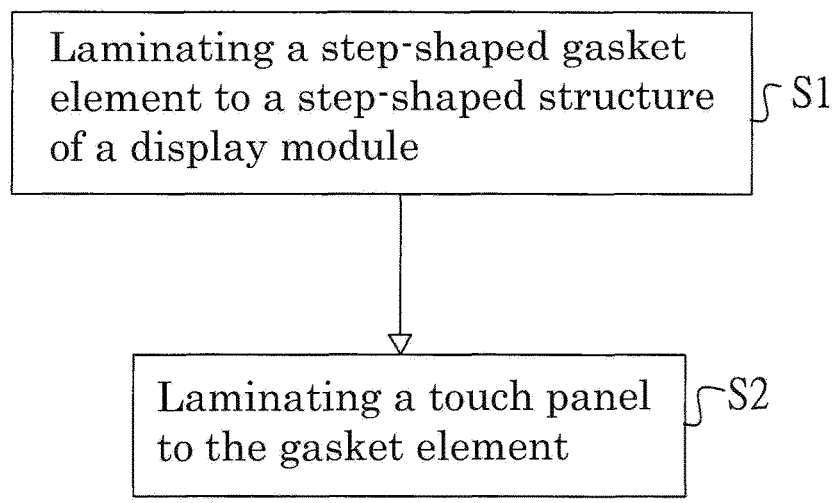
FIG. 8 is a flowchart of lamination of a touch display in accordance with the present disclosure.

FIG. 8 is a flowchart of lamination of a touch display in accordance with the present disclosure. Step S1 comprises laminating a step-shaped gasket element 16 to a step-shaped structure 25 of a display module 14, wherein the step-shaped structure 25 of the display module 14 is formed due to a height difference and is located in an edge area 110 of the display module 14, and wherein the gasket element 16 is laminated to the step-shaped structure 25 of the display module 14 by means of inosculation to fill the height difference in the edge area of the display module 14. Step S2 comprises laminating a touch panel to the gasket element 16. Due to the gasket element 16, an air gap G (as shown in FIG. 7) is formed between the touch panel 12 and the display module 14 in a non-edge area of the display module 14.

Lamination of the gasket element 16 to the touch panel 12 and the display module 14 is performed by a lamination device or fixture (not shown).

The lamination method for the touch display 10 is further illustrated below combining with FIG. 3~FIG 7.

Figure 3:
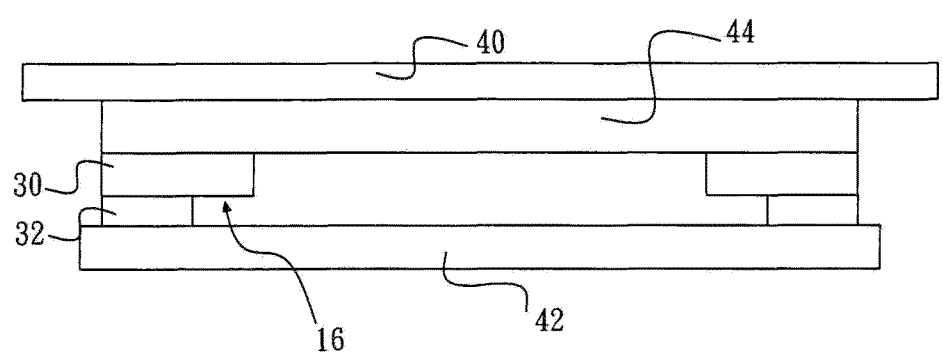
FIG. 3 is a sectional view of a double-layer step-shaped gasket element before it is used in accordance with the present disclosure.

FIG. 3 is a sectional view of a double-layer step-shaped gasket element before it is used in accordance with the present disclosure. The gasket element 16 has adhesive materials on its lamination surfaces. Before it is used, in order to avoid bonding with other objects, a heavy release film 44 and a light release film 42 are respectively pasted on the top surface and bottom surface of the gasket element 16, wherein size of the light release film 42 is larger than size of the heavy release film 44. Besides, in order to avoid side edges of the gasket element 16 colliding with other objects during transportation, a carrier tape 40, size of which is larger than size of the heavy release film 44, can be overlaid on the heavy release film 44, such that when collision with other objects occurs, side edges of the light release film 42 and the carrier tape 40 collide with the objects while the gasket element 16 is not affected. Material of the heavy release film 44 and the light release film 42 can be PET (polyethylene terephthalate). Material of the carrier tape 40 can be PE (polyethylene). The carrier tape 40 is pasted on the heavy release film 44. Bottom surface of the lower-layer gasket 32 is pasted on the light release film 42, and top surface of the upper-layer gasket 30 is pasted on the heavy release film 44.

Figure 4:
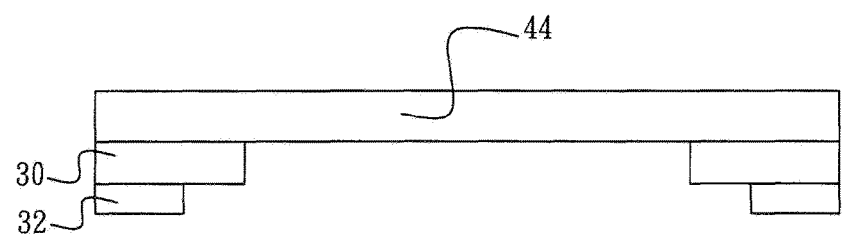
FIG. 4 is a sectional view of the double-layer step-shaped gasket element after a light release film and a carrier tape are stripped in accordance with the present disclosure.
Figure 5:
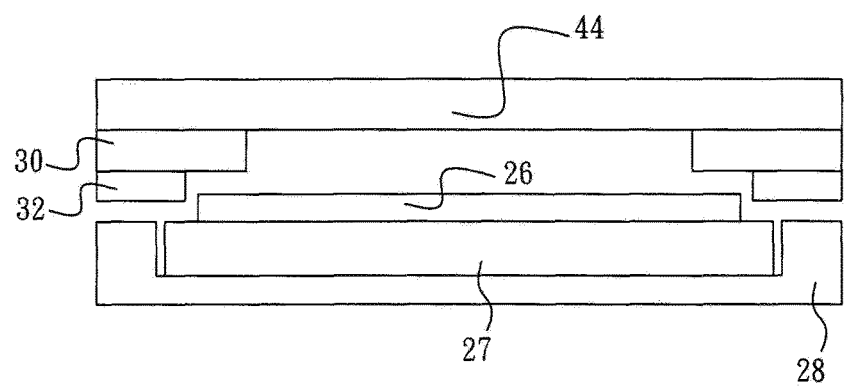
FIG. 5 is a sectional view of the double-layer step-shaped gasket element being laminated to the display module in accordance with the present disclosure.
Figure 6:
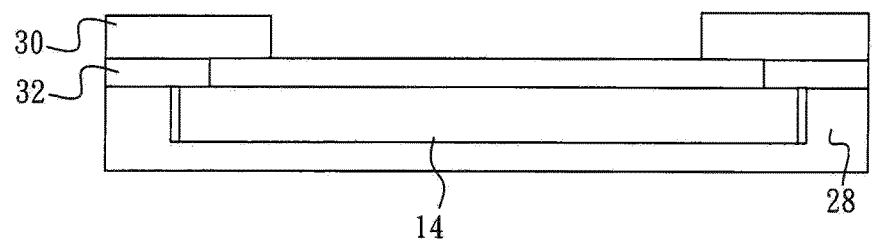
FIG. 6 is a sectional view of the double-layer step-shaped gasket element after a heavy release film is stripped in accordance with the present disclosure.

During lamination, as shown in FIG. 4, the carrier tape 40 and the light release film 42 are stripped firstly. Next, as shown in FIG. 5, bottom surface of the lower-layer gasket 32 is laminated to the outer frame 28 of the display module 14 and to part of the display body 28 by using a lamination device or fixture, and part of the bottom surface of the upper-layer gasket 30 is laminated to the polarizer 26 of the display module 14. Then, as shown in FIG. 6, the heavy release film 44 is stripped. Finally, as shown in FIG. 7, top surface of the upper-layer gasket 30 is laminated to the touch sensing substrate 18 of the touch panel 12 by using a lamination device or fixture.

The present disclosure provides a touch display having a laminated structure and a laminating method, such that a gasket element is not in a suspending state and is effectively laminated to a step-shaped structure of a display module, thereby enhancing the reliability of lamination of the touch panel and the display module.

In the above embodiments, the gasket element is applied to a touch display. Certainly, the gasket element, as a lamination structure, can be applied to the lamination between other workpieces. If there is a workpiece that has a step-shaped structure formed due to a height difference, the step-shaped gasket element can inosculate with the step-shaped structure of the workpiece to fill the height difference, thereby making the lamination between the workpiece and the other workpiece firmer, wherein the workpiece can be an element made of glass, plastic or other materials.

While certain embodiments have been shown and described, various modifications and substitutions can be made thereto without departing from the spirit and scope of the disclosure. Therefore, it is to be understood that the present disclosure has been described by way of illustration and not limitations.

What is claimed is:

1. A lamination method for a touch display, wherein the lamination method comprises:
    providing a display module, wherein:
        the display module comprises a polarizer, an outer frame and a display body,
        the outer frame has a recess for containing the display body so that the outer frame and the display body construct a planar surface, and
        the polarizer is disposed on the planar surface and protrudes therefrom so that the display module has a step-shaped structure defined by a top surface of the display body, a sidewall of the polarizer, and a top surface of the polarizer, and
        the step-shaped structure is located in an edge area of the display module;
    laminating a step-shaped gasket element to the step-shaped structure in the edge area of the display module to cover a first portion of the polarizer; and
    laminating a touch panel to the step-shaped gasket element, wherein:
        the top surface of the display body and the top surface of the polarizer face the touch panel,
        the step-shaped gasket element supports the touch panel in the edge area of the display module, and
        an air gap is formed between the touch panel and the display module.

2. The lamination method for a touch display as claimed in claim 1, wherein the air gap is formed between the touch panel and the display module in a non-edge area of the display module.

3. The lamination method for a touch display as claimed in claim 1, wherein:
    before the step-shaped gasket element is laminated, a first release film and a second release film are respectively pasted on a top surface and a bottom surface of the step-shaped gasket element,
    during lamination of the step-shaped gasket element to the step-shaped structure in the edge area of the display module, the second release film is stripped from the step-shaped gasket element so as to laminate the bottom surface of the step-shaped gasket element with the display module, and
    during the lamination of the touch panel to the step-shaped gasket element, the first release film is stripped from the step-shaped gasket element so as to laminate the touch panel onto the top surface of the step-shaped gasket element.

4. The lamination method for a touch display as claimed in claim 1, wherein the step-shaped gasket element is a one-piece body.

5. The lamination method for a touch display as claimed in claim 1, wherein the step-shaped gasket element comprises at least two gaskets.

6. The lamination method for a touch display as claimed in claim 3, wherein the top surface and the bottom surface of the step-shaped gasket element are adhesive surfaces.

7. The lamination method for a touch display as claimed in claim 1, wherein:
    the air gap is formed between the touch panel and a second portion of the polarizer that is not covered by the step-shaped gasket element, and
    a gap is formed between edges of the display body and the outer frame.

8. The lamination method for a touch display as claimed in claim 7, wherein:
    the step-shaped gasket element is a double-layer step-shaped structure comprising an upper-layer gasket and a lower-layer gasket,
    a bottom surface of the lower-layer gasket is laminated to the planar surface,
    a protruding part of the upper-layer gasket is laminated to the polarizer, and
    a top surface of the upper-layer gasket is laminated to the touch panel.

9. The lamination method for a touch display as claimed in claim 7, wherein:
    the touch panel comprises a touch sensing substrate having a touch sensing layer and a cover glass,
    the touch sensing substrate is laminated to the cover glass by an adhesive,
    a bottom surface of the touch sensing substrate is attached to the step-shaped gasket element, and
    the air gap is formed between the bottom surface of the touch sensing substrate and the second portion of the polarizer that is not covered by the step-shaped gasket element.

10. A touch display having a laminated structure, comprising:
    a touch panel;
    a display module, wherein:
        the display module comprises a polarizer, an outer frame and a display body,
        the outer frame has a recess for containing the display body,
        a top surface of the outer frame facing the touch panel and a top surface of the display body facing the touch panel lie in a same plane to define a planar surface, and
        the polarizer is disposed on the planar surface and protrudes from the planar surface in a direction toward the touch panel so that the display module has a step-shaped structure located in an edge area of the display module; and a step-shaped gasket element located between the touch panel and the display module, wherein:
the step-shaped gasket element is located over the step-shaped structure in the edge area of the display module to cover a first portion of the polarizer and to support the touch panel, and
an air gap is formed between the touch panel and the display module.

11. The touch display as claimed in claim 10, wherein the air gap is formed between the touch panel and the display module in a non-edge area of the display module.

12. The touch display as claimed in claim 10, wherein the step-shaped gasket element is a one-piece body.

13. The touch display as claimed in claim 10, wherein the step-shaped gasket element comprises at least two gaskets.

14. The touch display as claimed in claim 10, wherein:
the step-shaped gasket element has a top surface contacting the touch panel and a bottom surface contacting the display module, and
the top surface and the bottom surface are adhesive surfaces.

15. The touch display as claimed in claim 10, wherein the air gap is formed between the touch panel and a second portion of the polarizer that is not covered by the step-shaped gasket element.

16. The touch display as claimed in claim 15, wherein:
the step-shaped gasket element is a double-layer step-shaped structure comprising an upper-layer gasket and a lower-layer gasket,
a bottom surface of the lower-layer gasket is laminated to the planar surface,
a protruding part of the upper-layer gasket is laminated to the polarizer, and
a top surface of the upper-layer gasket is laminated to the touch panel.

17. The touch display as claimed in claim 15, wherein:
the touch panel comprises a touch sensing substrate having a touch sensing layer and a cover glass,
the touch sensing substrate is laminated to the cover glass by an adhesive,
a bottom surface of the touch sensing substrate is attached to the step-shaped gasket element, and
the air gap is formed between the bottom surface of the touch sensing substrate and the second portion of the polarizer that is not covered by the step-shaped gasket element.

18. The touch display as claimed in claim 17, wherein a black mask is formed between the cover glass and the touch sensing substrate to define the edge area.

19. The touch display as claimed in claim 10, wherein the step-shaped gasket element is made of a rubber, a plastic, or a foam.

20. The touch display as claimed in claim 10, wherein a gap is formed between edges of the display body and the outer frame.

\* \* \* \* \*